US 11,747,244 B2

(12) United States Patent
Glauser et al.

(10) Patent No.: US 11,747,244 B2
(45) Date of Patent: Sep. 5, 2023

(54) LABORATORY SYSTEM AND METHOD FOR SEPARATING INTERFERING SUBSTANCES CONTAINED IN TEST SAMPLES

(71) Applicant: Roche Diagnostics Operations, Inc., Indianapolis, IN (US)

(72) Inventors: Michael Glauser, Zug (CH); Dietmar Kappelhoff, Weggis (CH); Youssef Khayali, Zumikon (CH)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 308 days.

(21) Appl. No.: 16/385,712

(22) Filed: Apr. 16, 2019

(65) Prior Publication Data

US 2019/0346348 A1 Nov. 14, 2019

(30) Foreign Application Priority Data

May 9, 2018 (EP) ..................... 18171441

(51) Int. Cl.
G01N 1/34 (2006.01)
B01L 3/00 (2006.01)
(Continued)

(52) U.S. Cl.
CPC ............. *G01N 1/34* (2013.01); *B01L 3/502* (2013.01); *G01N 1/405* (2013.01); *G01N 1/4055* (2013.01); *G01N 1/4077* (2013.01); *B01L 2200/0631* (2013.01); *B01L 2200/10* (2013.01); *B01L 2200/141* (2013.01); *B01L 2200/143* (2013.01);
(Continued)

(58) Field of Classification Search
CPC ............ G01N 1/34; G01N 2035/00465; B01L 2200/10
See application file for complete search history.

(56) References Cited

U.S. PATENT DOCUMENTS

| 2013/0040403 A1 | 2/2013 | Tikanoja et al. |
| 2016/0025722 A1* | 1/2016 | Tajima ............. G01N 33/54386 |
| | | 435/287.2 |
| 2018/0120204 A1* | 5/2018 | Tikanoja ............. G01N 33/543 |

FOREIGN PATENT DOCUMENTS

| EP | 2383575 A1 | 11/2011 |
| EP | 2549269 A1 | 1/2013 |

(Continued)

OTHER PUBLICATIONS

Leary, Elizabeth Teng et al., Evaluation of an immunoseparation method for quantitative measurement of remnant-like particle-cholesterol in serum and plasma, Clinical Chemistry, 1998, pp. 2490-2498, vol. 44, No. 12.

(Continued)

*Primary Examiner* — Gailene Gabel
(74) *Attorney, Agent, or Firm* — Woodard, Emhardt, Henry, Reeves & Wagner, LLP

(57) ABSTRACT

A laboratory system and a method for separating interfering substances contained in test samples is presented. The laboratory system comprises separation vessels comprising solid surfaces and capturing molecules which are immobilized on the solid surfaces. The capturing molecules of the separation vessels are configured to bind interfering substances of laboratory tests of different analytical methods.

11 Claims, 5 Drawing Sheets

(51) Int. Cl.
 *G01N 1/40* (2006.01)
 *G01N 35/00* (2006.01)
(52) U.S. Cl.
 CPC . *B01L 2300/069* (2013.01); *B01L 2300/0681* (2013.01); *G01N 2001/4088* (2013.01); *G01N 2035/00019* (2013.01); *G01N 2035/00465* (2013.01); *G01N 2035/00475* (2013.01)

(56) References Cited

FOREIGN PATENT DOCUMENTS

| | | |
|---|---|---|
| EP | 2631007 | 8/2013 |
| EP | 2631007 A1 | 8/2013 |
| JP | H07026767 U | 5/1995 |
| JP | H11502625 | 3/1999 |
| JP | 2001272409 | 10/2001 |
| JP | 2009510481 | 3/2009 |
| WO | 2018/071813 A1 | 4/2018 |
| WO | WO 2018/060447 | 4/2018 |
| WO | WO 2018/071813 | 4/2018 |

OTHER PUBLICATIONS

Tate, Jill and Ward, Greg, Interferences in Immunoassay, Clinical Biochemistry Reviews, 2004, pp. 105-120, vol. 25.

* cited by examiner

| Test sample records | | |
|---|---|---|
| Test sample identity | Test sample attributes | |
| | Laboratory test ordered for the test sample | Patient information | Invalid test results |
| 1 | TSH | none | No |
| 2 | Iron | none | Yes |
| 3 | HIV | Heparin | No |
| .... | | | |

FIG. 4

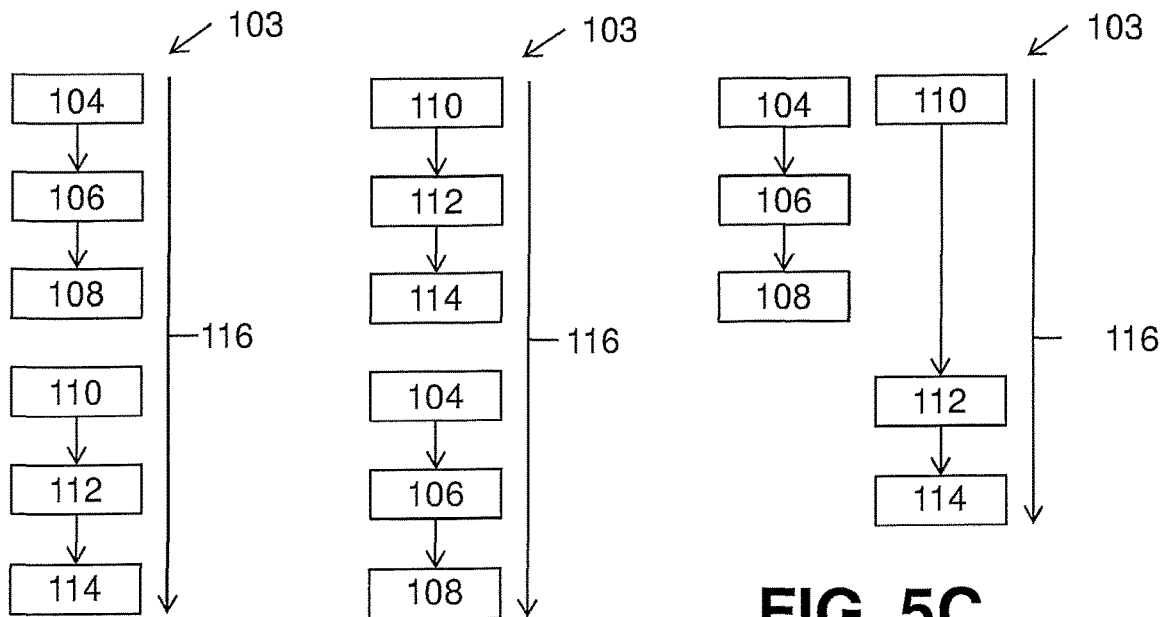
FIG. 5A  FIG. 5B  FIG. 5C
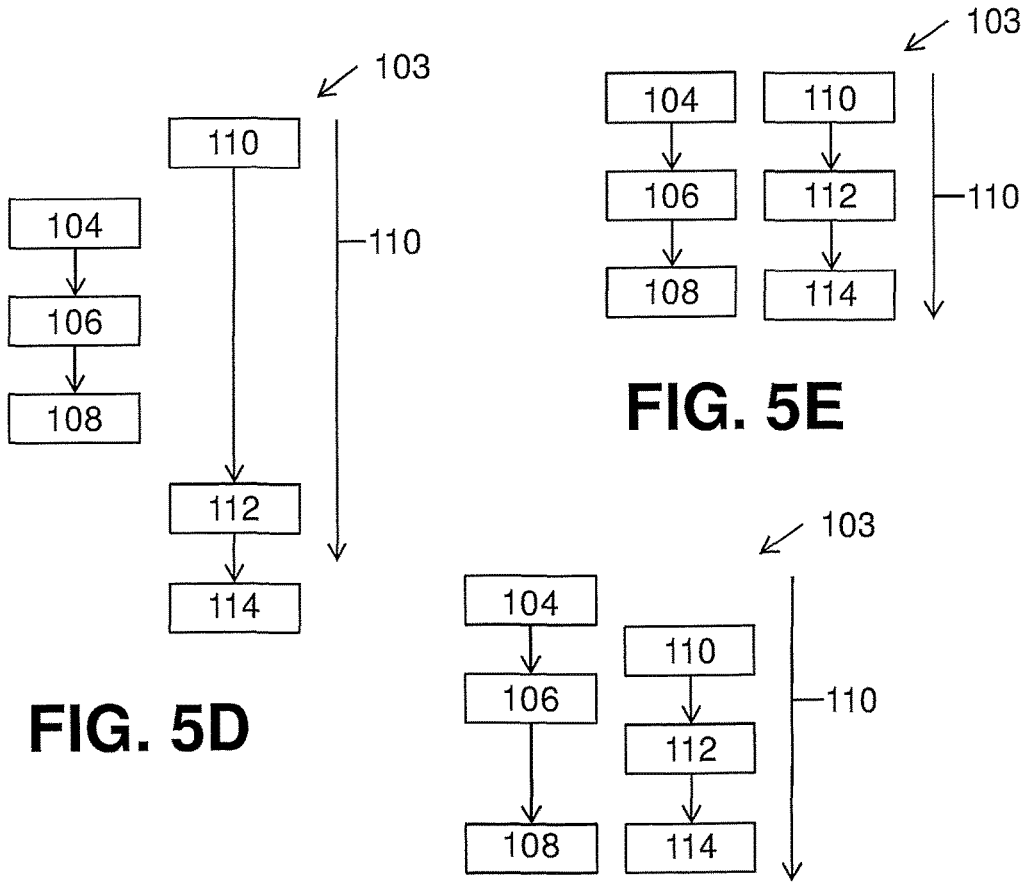
FIG. 5D
FIG. 5E
FIG. 5F

LABORATORY SYSTEM AND METHOD FOR SEPARATING INTERFERING SUBSTANCES CONTAINED IN TEST SAMPLES

CROSS-REFERENCE TO RELATED APPLICATIONS

This application claims priority to EP 18171441.1 filed May 9, 2018, which is hereby incorporated by reference.

BACKGROUND

The present disclosure generally relates to the field of in vitro diagnostic test sample preparation and, in particular, to a laboratory system and a method for separating interfering substances contained in test samples.

Interferences with laboratory tests occur when interfering substances negatively interact with analytes and/or test reagents and alter the measurable analyte concentrations of laboratory tests. This may lead to incorrect (elevated or lowered) test results or worst case to false negative or false positive test results causing misinterpretation of test results, inappropriate further testing, and initiation of treatments with potentially hazardous outcomes for the patient. As interferences may be analyte and/or test reagent dependent certain laboratory tests may have their own and specific interferences depending on the underlying analytical method or used analytical module. Interferences with laboratory tests may either originate from endogenous interfering substances (naturally present in patient) or exogenous interfering substances (not naturally present in patient) which interfere with certain laboratory tests. Accordingly, interferences may also be patient dependent.

In diagnostic laboratory environments, test samples are processed and analyzed on multiple stations such as pre-analytical stations, analytical stations comprising one or more analytical modules, and post-analytical stations. Typically, such diagnostic laboratory environments have several different analytical stations such as immunochemistry analyzers, clinical chemistry analyzers, nucleic acid analyzers, coagulation analyzers, haematology analyzers, urine analyzers, and blood gas analyzers conducting different analytical methods in order to provide a laboratory test portfolio for testing different analytes or parameters for a comprehensive diagnostic.

A lot of effort goes into minimizing interferences already during development of new laboratory tests, e.g., by blocking agents or specific test reagent design. However, laboratory test portfolios are subject to constant change and with the launch of new laboratory tests also new interferences may emerge. Additionally, new medical or environmental conditions associated with a patient (e.g., biotin mega-doses taken as nutritional supplement) may also cause new interferences. The implementation of interference minimizing methods for newly emerging interfering substance on validated analytical stations may generate additional costs per analytical station or may not be realizable as new hardware components (e.g., integration of a separation device) would be required. Furthermore, such interference minimizing methods may have a negative impact on the throughput of the analytical stations as additional method steps or processing steps like adding blocking agents may be required. Thus, under certain circumstances, such new interferences, may not be remedied by pre-existing analytical stations, analytical modules or analytical workflows.

Therefore, there is a need to separate interfering substances contained in test samples in a simple, flexible, and cost-efficient way as well as to improve conventional sample preparation, particularly to better serve the needs of automated in vitro diagnostic sample vessel preparation.

SUMMARY

According to the present disclosure, a laboratory system for separating interfering substances contained in test samples is presented. The laboratory system can comprise at least a first and a second separation vessel. Each separation vessel can comprise a solid surface and a capturing molecule and the capturing molecule can be immobilized on the solid surface. The capturing molecule of the first separation vessel can be configured to bind an interfering substance of a laboratory test of a first analytical method. The capturing molecule of the second separation vessel can be configured to bind an interfering substance of a laboratory test of a second analytical method. The first analytical method can be different from the second analytical method. The laboratory system can further comprise at least one laboratory instrument comprising at least one separation station. The at least one separation station can be configured to receive the at least first and/or second separation vessel and to separate a test sample contained in the at least first and/or second separation vessel from the solid surface of the at least first and/or second separation vessel.

A method for separating interfering substances contained in test samples is also presented. The method can comprise steps:
a) selecting at least a first test sample based on at least one selective test sample attribute;
b) combining together the first test sample with a solid surface and capturing molecule of a first separation vessel for a period of time and under conditions sufficient to permit an interfering substance of a laboratory test of a first analytical method to be bound to the capturing molecule or sufficient to permit an interfering substance of a laboratory test of a first analytical method to be bound to the capturing molecule and said capturing molecule to be immobilized on the solid surface of the first separation vessel;
c) separating the at least first test sample from the solid surface of the first separation vessel;
d) selecting at least a second test sample based on at least one selective test sample attribute;
e) combining together the second test sample with a solid surface and capturing molecule of a second separation vessel for a period of time and under conditions sufficient to permit an interfering substance of a laboratory test of a second analytical method to be bound to the capturing molecule or sufficient to permit an interfering substance of a laboratory test of a second analytical method to be bound to the capturing molecule and said capturing molecule to be immobilized on the solid surface of the second separation vessel; and
f) separating the at least one second test sample from the solid surface of the second separation vessel, wherein step a) can be executed before, after, or at the same time of step d) and a step sequence comprising the steps b) and c) can be executed before, after, or at the same time of a step sequence comprising the steps e) and f). The first analytical method can be different from the second analytical method.

Accordingly, it is a feature of the embodiments of the present disclosure to provide separate interfering substances contained in test samples in a simple, flexible, and cost-efficient way as well as to improve conventional sample preparation, particularly to better serve the needs of automated in vitro diagnostic sample vessel preparation. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 4 illustrates a data concept of the data base comprising test sample records according to an embodiment of the present disclosure.

FIG. 5A illustrates a flowchart of a method for separating interfering substances contained in test samples where step a) can be executed before step d) and a step sequence comprising steps b) and c) can be executed before a step sequence comprising steps e) according to an embodiment of the present disclosure.

FIG. 5B illustrates a flowchart of a method for separating interfering substances contained in test samples where step a) is executed after step d) and the step sequence comprising steps b) and c) are executed after the step sequence comprising steps e) and f) according to an embodiment of the present disclosure.

FIG. 5C illustrates a flowchart of a method for separating interfering substances contained in test samples where step a) is executed at the same time of step d) according to an embodiment of the present disclosure.

FIG. 5D illustrates a flowchart of a method for separating interfering substances contained in test samples where step a) is executed after step d) and then the step sequence comprising steps b) and c) are executed before the step sequence comprising steps e) and f) according to an embodiment of the present disclosure.

FIG. 5E illustrates a flowchart of a method for separating interfering substances contained in test samples where if the laboratory instrument comprises at least two separation devices, the step sequence comprising steps b) and c) are executed at the same time of the step sequence comprising steps e) and f) according to an embodiment of the present disclosure.

FIG. 5F illustrates a flowchart of a method for separating interfering substances contained in test samples where the timing of steps b) and c) are independent from the timing of the steps e) and f) according to an embodiments of the present disclosure.

DETAILED DESCRIPTION

Figure 1:
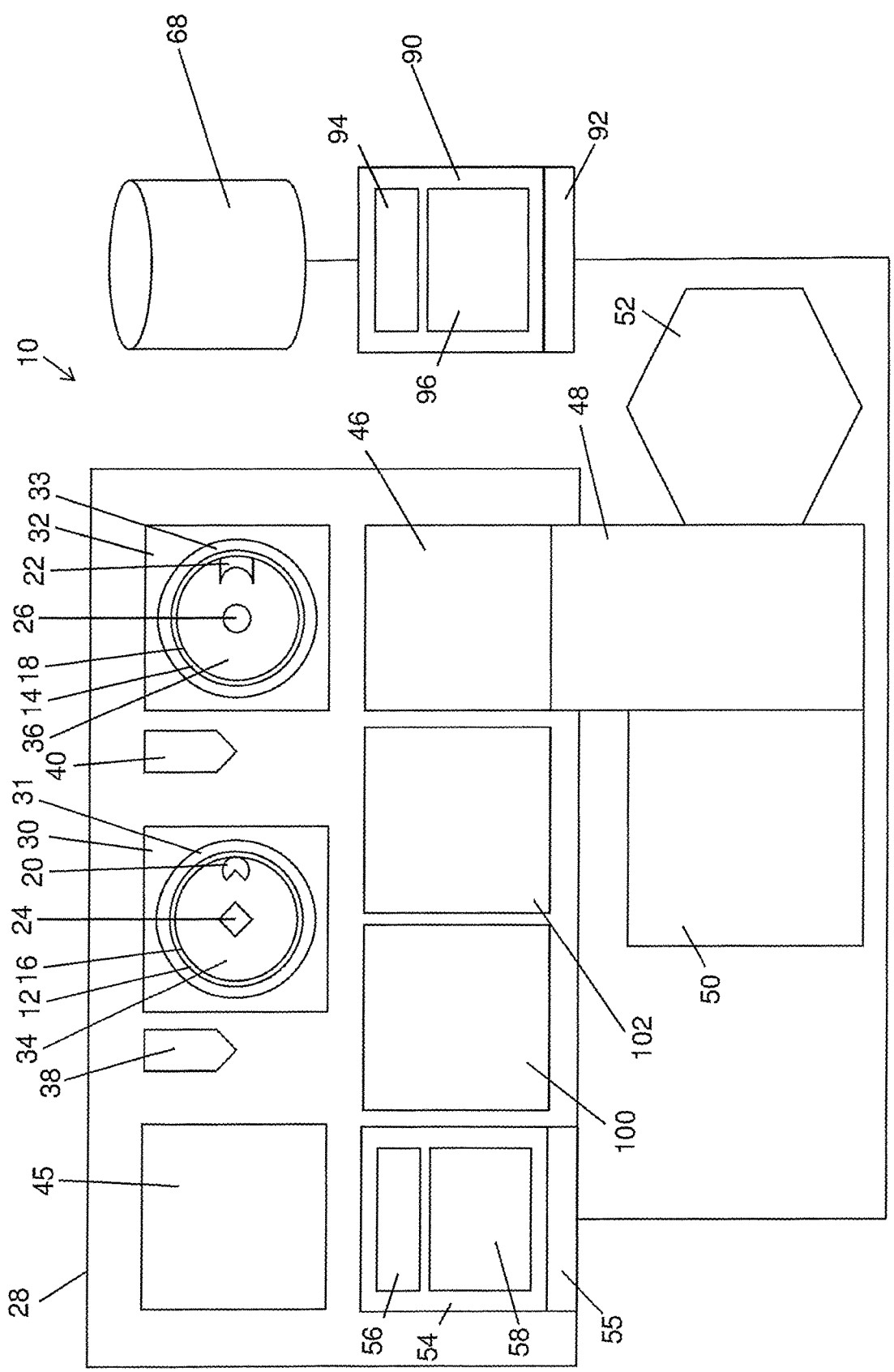
FIG. 1 illustrates an embodiment of the laboratory system for separating interfering substances contained in test samples according to an embodiment of the present disclosure.
Figure 2:
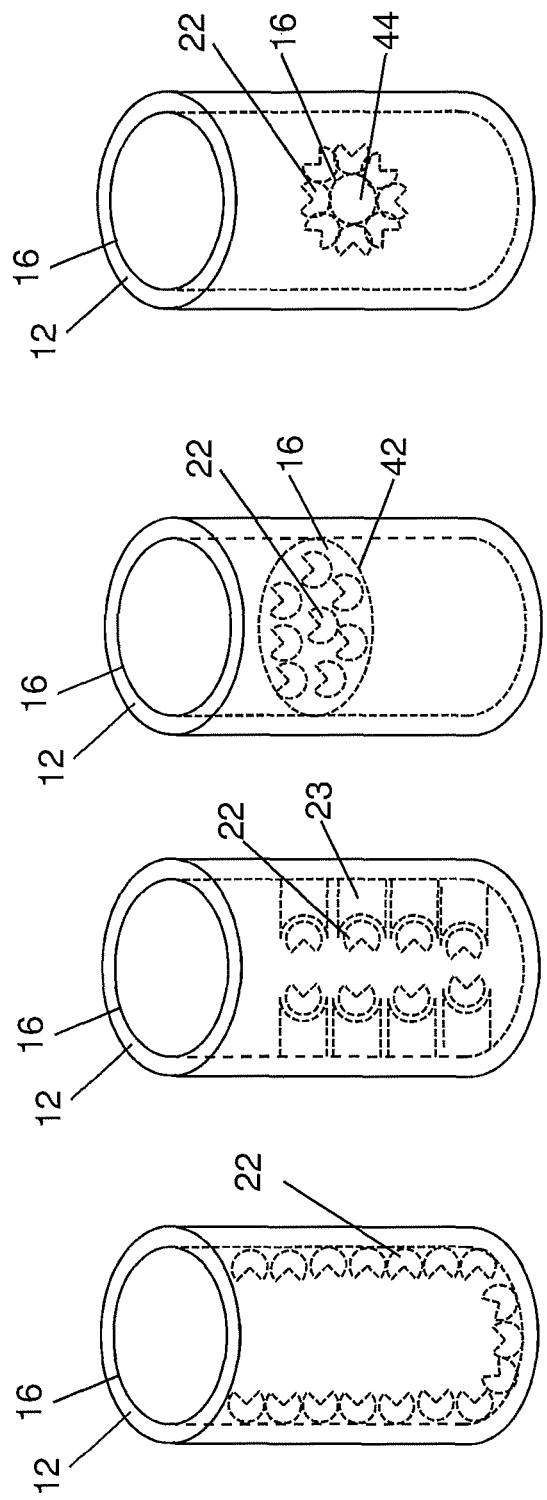
FIG. 2A illustrates the inner surface of the separation vessel coated with the capturing molecule according to an embodiment of the present disclosure.
FIG. 2B illustrates the inner surface of the separation vessel coated with a linker molecule capable of binding or capturing the capturing molecule according to an embodiment of the present disclosure.
FIG. 2C illustrates the separation vessel comprising a filter and the solid surface comprised by the filter and coated with capturing molecules according to an embodiment of the present disclosure.
FIG. 2D illustrates the separation vessels comprising beads and the solid surfaces is comprised by the surface of the beads, which is coated with capturing molecules according to an embodiments of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A laboratory system for separating interfering substances contained in test samples is presented. The laboratory system can comprise at least a first and a second separation vessel. Each separation vessel can comprise a solid surface and a capturing molecule and the capturing molecule can be immobilized on the solid surface. The capturing molecule of the first separation vessel can be configured to bind an interfering substance of a laboratory test of a first analytical method. The capturing molecule of the second separation vessel can be configured to bind an interfering substance of a laboratory test of a second analytical method. The first analytical method can be different from the second analytical method. The laboratory system can further comprise at least one laboratory instrument comprising at least one separation station. The at least one separation station can be configured to receive the at least first and/or second separation vessel and to separate a test sample contained in the at least first and/or second separation vessel from the solid surface of the at least first and/or second separation vessel.

As used herein, the term "interfering substance" can relate to a substance which interacts with an analyte of a test sample and/or test reagent of a laboratory test and falsely alters the measurable analyte concentration resulting in an incorrect test result of the test sample. Interfering substances can be classified as endogenous or exogenous interfering substances. Endogenous interfering substances are naturally present in a patient whereas exogenous interfering substances are introduced into the patient. Non-limiting examples of endogenous interfering substances are hemoglobin, bilirubin, lipids, proteins, or antibodies (e.g., Immunoglobulin G (IgG)). Non-limiting examples of exogenous interfering substances are drugs, metabolites, additives (e.g., vitamins like biotin), poisons, herbal products, IV fluids, substances used as therapy (e.g., heparin, antibodies, and the like), or components from the test sample preparation. Certain interfering substances may interfere with a specific laboratory test and other interfering substances may interfere with multiple laboratory test. For example, biotin is known to interfere with the TSH (Thyroid-stimulating hormone) laboratory test which is based on an immunological test reaction. Heparin is known to interfere with PCR (polymerase chain reaction) based laboratory testing which is a widely used analytical method in molecular biological analytics. Hemoglobin is known to interfere with PCR (Polymerase chain reaction) based laboratory tests as well as with clinical chemistry laboratory tests such creatinine, triglycerides, glucose, cholesterol, phosphorus, uric acid, iron, total protein, and bilirubin.

As used herein, the term "test sample" can relate to a patient's specimen (e.g., serum, plasma, whole blood, urine, stool, sputum, cerebrospinal fluid, bone marrow, and the like) from which the presence and if desired the concentration of an analyte or parameter can be determined using a laboratory test. As a test sample is taken from an individual patient at a certain time, corresponding test sample attributes are unique for each test sample as further described below.

The term "separation vessel" as used herein can relate to a container or receptacle adapted to receive a test sample from which an interfering substance, if an interfering substance is present in the test sample, can be separated by binding or immobilizing the interfering substance to a solid surface of the container via a capturing molecule or via a capturing molecule and linker molecule. The material as well as the dimension of the separation vessel like diameter, side length, height, geometry varies and may depend on the test sample or test sample type, method or processing step(s) required to separate an interfering substance, and manufacturer.

In one embodiment, the separation vessel may be a vessel with a cylindrical, conical or cubic shape. The separation vessel may have a closed bottom and an open top. The closed bottom of the cylindrical vessel can be rounded and the open top may be closable, e.g., by using a cap. A non-limiting example of a single cylindrical or conical separation vessel is a primary or secondary test sample vessel which is well known in the art. Alternatively, two or more separation vessels may be arranged as a multi-separation vessel assembly. A non-limiting example of such a multi-separation vessel assembly is a multiwell-plate which is well known in the art.

In another embodiment, the separation vessel may be formed as a flow-through vessel comprising an inlet and outlet configured to be operatively coupled to a filtration station.

In one embodiment of the separation vessel, the separation vessel can be a rotatable separation vessel. The rotatable separation vessel can comprise a longitudinal axis about which the vessel can be rotatable. The rotatable separation vessel may comprise an upper portion comprising a top opening for receiving a test sample. The rotatable separation vessel may further comprise a lower portion for holding the test sample while the rotatable separation vessel is resting. The rotatable separation vessel may further comprise an intermediate portion located between the upper portion and the lower portion and the intermediate portion comprising a lateral chamber for holding the test sample while the rotatable separation vessel is rotating. The lateral chamber may be removable from the lower portion. The geometry of such a rotatable separation vessel may be designed as described in EP3174970A1, reference numbers 200, 300, 400, 500 in FIGS. 1, 2, 3, 4, 5, 7 and corresponding description and which is hereby incorporated by reference.

The separation vessel can comprise a solid surface on which a capturing molecule is or can be immobilized or bound. In one embodiment, the solid surface of the separation vessel can be coated with the capturing molecule. For example, primary antibodies, nucleic acids, or enzymes which are capable of binding or capturing a specific interfering substance may be attached to the solid surface using known techniques in the art. In another embodiment, the solid surface may be coated with a linker molecule which is capable of binding or capturing the capturing molecule. The linker molecule may be attached to the solid surface using techniques known in the art and the capturing molecule can be added to and suspended in the test sample. For example, a separation solution containing dissolved capturing molecules can be added to the test sample in the separation vessel to generate a separation mixture. Or the separation vessel can be prefilled with a separation solution containing dissolved capturing molecules and the test sample can be added to the separation vessel to generate a separation mixture. Thus, the capturing molecule and the captured interfering substance can then be immobilized on the solid surface of the separation vessel after the capturing molecule was binding to the linker molecule. For example, secondary antibodies which are capable of binding a primary antibody which, in turn, can be configured to bind an interfering substance of a laboratory test can be attached to the solid surface using techniques known in the art. The material of the solid surface may depend on the test sample or test sample type, method or processing step(s) required to separate an interfering substance, chemical properties of the capturing molecule or linker molecule, and manufacturer.

As a variety of different interfering substance specific capturing molecules can be immobilized on the solid surface of different separation vessels, the laboratory system can advantageously provide a high flexibility for separating a variety of different interfering substances of different laboratory tests. Furthermore, as the coating of the solid surface with capturing molecules or linker molecules is not time and cost intensive, separation vessels for new emerging interfering substances can be developed and used in shortest time.

As used herein, the term "capturing molecule" can relate to a molecule or compound which can be configured to bind non-covalently or covalently to an interfering substance. In one embodiment, the capturing molecule may be directly attached and therefore immobilized on the solid surface of the separation vessel. In another embodiment, the capturing molecule may further be configured to bind to a linker molecule which can be attached on the solid surface of the separation vessel. Accordingly, the capturing molecule may be immobilized on the solid surface of the separation vessel by binding to the linker molecule. And the interfering substance, in turn, may be immobilized on the solid surface by binding to the capturing molecule. A non-limiting example of a capturing molecule is avidin or streptavidin which can non-covalently bind to the interfering substance biotin. Another non-limiting example of a capturing molecule is triethylaminoethyl cellulose which can bind to the interfering substance heparin. A further non-limiting example of a capturing molecule is HemogloBind™ which is a poly-electric polymer composition which can bind to the interfering substance hemoglobin. Also nucleic acids with complementary sequences to an interfering target sequence can serve as capturing molecules. Furthermore, enzymes with specific binding characteristics may be used as capturing molecules coated on the solid surfaces.

In one embodiment of the separation vessel, the solid surface can be comprised by the inner surface of the separation vessel. For example, the inner surface of a test sample vessel or multiwell-plate may be coated with a capturing molecule or linker molecule. In another example, the lateral chamber of a rotatable separation vessel as described above may be coated with a capturing molecule or linker molecule. The inner surface of the separation vessel may have a folded structure in order to increase the size of the solid surface for an improved and more efficient interfering substance immobilization.

In another embodiment of the separation vessel, the separation vessel can comprise a filter and the solid surface can be comprised by the filter. Accordingly, a filter located in a test sample vessel may be coated with a capturing molecule or linker molecule.

As used herein, the term "filter" can relate to a porous structure or matrix with a solid surface through which a test sample can pass and thereby interfering substances contained in the test sample can be retained by the immobilized capturing molecules on the filter. The material as well as properties of the filter like pore diameter or thickness varies and may depend on the test sample or test sample type, method or processing step(s) required to separate an interfering substance, and manufacturer. The filter may be a removable filter. For example, the filter may be attached in the interior of the separation vessel by any suitable methods such as, for example, mechanical fastener elements so that the filter can be inserted and removed from the separation vessel. This can have the advantage that after removing the filter, the separation vessel can further be used as test sample vessel and no additional test sample vessels may be required for further processing like, for example, analyzing the test sample. Alternatively, the filter may be integrally molded with the inner surface of the separation vessel.

In a further embodiment of the separation vessel, the separation vessel can comprise beads and the solid surface can be comprised by the surface of the beads. As used herein, the term "beads" can relate to particles comprising a solid surface which can be coated with capturing molecules or linker molecules. The separation vessel may be prefilled with the beads which can then be suspended by adding the test sample to the separation vessel to generate a separation mixture. Alternatively, the beads may be dissolved in a separation solution which can be added to the test sample in the separation vessel. After binding or immobilizing the capturing molecule and the captured interfering substance to the solid surface of the beads, the interfering substance can be separated from the test sample by centrifugation and subsequent transfer of the test sample to a new test sample vessel. The material, the mass as well as the dimension of the particles like diameter or geometry can vary and may depend on the test sample or test sample type, method or processing step(s) required to separate an interfering substance, and manufacturer.

In a more specific embodiment of the beads, the beads can be magnetic beads. Accordingly, after binding or immobilizing the capturing molecule and the captured interfering substance to the solid surface of the beads, the interfering substance can be separated from the test sample by applying a magnetic field, e.g., by using a magnetic separation and incubation station as described further below.

The laboratory system can comprise at least a first and a second separation vessel. In one embodiment, the at least first and second separation vessel can be the same and each separation vessel can comprise the same capturing molecule which can be configured to bind an interfering substance of a laboratory test of a first analytical method and of a laboratory test of a second analytical method. For example, the at least first and second separation vessel may be a cylindrical separation vessel and the inner surfaces may be coated with HemogloBind™ for separating the interfering substance hemoglobin which is known to interfere with PCR based laboratory tests and multiple clinical chemistry laboratory tests.

In another embodiment, the at least first and second separation vessel can be the same and each separation vessel can comprise a different capturing molecule, wherein one capturing molecule can be configured to bind an interfering substance of a laboratory test of a first analytical method and the other capturing molecule can be configured to bind a different interfering substance of a laboratory test of a second analytical method. For example, the at least first and second separation vessel may be a cylindrical separation vessel. The inner surface of the first separation vessel may be coated with triethylaminoethyl cellulose for separating the interfering substance heparin which is known to interfere with PCR based laboratory tests. And the inner surface of the second separation vessel may be coated with avidin or streptavidin for separating the interfering substance biotin which is known to interfere with TSH (Thyroid-stimulating hormone) laboratory tests.

In a further embodiment, the at least first and second separation vessels can be different and each separation vessel can comprise the same capturing molecule which can be configured to bind an interfering substance of a laboratory test of a first analytical method or of a laboratory test of a second analytical method. For example, the at least first separation vessel may be a cylindrical separation vessel whose inner surface may be coated with HemogloBind™ for separating the interfering substance hemoglobin which is known to interfere with PCR based laboratory tests and clinical chemistry laboratory tests. And the at least second separation vessel may be a cylindrical separation vessel comprising a removable filter which may be coated with HemogloBind™ for separating the interfering substance hemoglobin.

In an additional embodiment, the at least first and second separation vessel can be different and each separation vessel can comprise a different capturing molecule, wherein one capturing molecule can be configured to bind an interfering substance of a laboratory test of a first analytical method and the other capturing molecule can be configured to bind a different interfering substance of a laboratory test of a second analytical method. For example, the at least first separation vessel may be a cylindrical separation vessel whose inner surface may be coated with triethylaminoethyl cellulose for separating the interfering substance heparin which is known to interfere with PCR based laboratory tests. And the at least second separation vessel may be a cylindrical separation vessel comprising a removable filter which may be coated with avidin or streptavidin for separating the interfering substance biotin which is known to interfere with the TSH (Thyroid-stimulating hormone) laboratory tests.

In one embodiment, the at least first and/or second separation vessel can comprise multiple different capturing molecules which can be configured to bind multiple interfering substances of a laboratory test of a first analytical method or of a laboratory test of a second analytical method. This can have the advantage that multiple interfering substances can be separated from a test sample using only one separation vessel. For example, the inner surface of the separation vessel may be coated with multiple antibodies or nucleic acids each specifically binding to a certain interfering substance.

As used herein, the term "laboratory test" can relate to an analysis or investigation of a test sample in order to determine the presence and if desired the concentration of an analyte of interest. Thus, a laboratory test can define which analyte or parameter has to be analyzed in the test sample. Based on the determined presence and/or concertation of the analyte, a qualitative or quantitative test result can be generated which can help to made a diagnosis, to plan a treatment or therapy, to see if a treatment or therapy is working, or to monitor a disease over time. The analyte to be examined may negatively interact with an interfering substance which may be specific for a certain laboratory test.

As used herein, the term "analytical method" can relate to a technique or technology that can be used for the qualitative and/or quantitative detection or measurement of a signal or physical parameter associated with an analyte. The analytical method can define how and with which method an analyte can be detected in a test sample. The analytical method may comprise only a detection method if a signal or physical parameter associated with an analyte is directly detectable. Alternatively, the analytical method may comprise a preceding test reaction for developing a detectable signal associated with an analyte and a detection method for detecting the developed signal. The detected or measured signal or physical parameter associated with an analyte can then be processed to a test result of the laboratory test indicating the presence and/or the concentration of an analyte of interest in the test sample.

In one embodiment of the laboratory system, the first and the second analytical method can comprise different detection methods or same detection methods with different preceding test reactions. The detection method can be selected from a group comprising photometry, spectroscopy, fluorometry, turbidimetry, nephelometry, luminescence measurement, fluorescence polarimetry, flame photometry, atomic absorption photometry, potentiometry, amperometry, coulometry, resistance measurement, flow cytometry, coulter method, radiometry, imaging method, mass spectrometry, visual inspection, gravimetry, and thermometry. And the preceding test reaction can be selected from a group comprising a chemical test reaction, immunological test reaction, enzymatic test reaction, molecular biological test reaction, dye staining, coagulation test reaction, agglutination test reaction, or combinations thereof.

As used herein, the term "photometry" can relate to a method for the measurement of an analyte-related light intensity or photocurrent, in terms of the perceived brightness to the human eye, using a photometer. It is distinct from radiometry, which is the measurement of an analyte-related radiant energy (including light) in terms of absolute power.

As used herein, the term "spectroscopy" can relate to a method for the measurement of spectra produced when an analyte-related matter interacts with or emits electromagnetic radiation using a spectrometer.

As used herein, the term "fluorometry" can relate to a method for the measurement of parameters of analyte-related fluorescence such as the intensity and wavelength distribution of emission spectrum after excitation by a certain spectrum of light using a fluorometer.

As used herein, the term "turbidimetry" can relate to a method for measuring and comparing an analyte-related turbidity of liquids by viewing light through them and determining how much light is cut off or attenuated using a turbidimeter.

As used herein, the term "nephelometry" can relate to a method for determining an analyte-related concentration or particle size of suspensions by transmitted or reflected or scattered light using a nephelometer.

As used herein, the term "luminescence measurement" can relate to a method for the measurement of parameters of an analyte-related luminescence such as its intensity and wavelength distribution using a luminometer.

As used herein, the term "fluorescence polarimetry" can relate to a method for measuring analyte-related fluorescence intensities along different axes of polarization using a fluorescence polarimeter.

As used herein, the term "flame photometry" can relate to a method in which an analyte-related metallic salt in solution is vaporized in a hot flame and subjected to quantitative analysis by measuring the intensities of the spectral lines of the metal using a flame photometer. It is an inorganic chemical analysis to determine the concentration of certain metal ions, among them sodium, potassium, lithium, and calcium.

As used herein, the term "atomic absorption photometry" can relate to a spectroanalytical method for the quantitative determination of analyte-related chemical elements using the absorption of optical radiation (light) by free atoms in the gaseous state using an atomic absorption photometer.

As used herein, the term "potentiometry" can relate to the measurement of an analyte-related electrical potential using a potentiometer or an ion-selective electrode.

As used herein, the term "amperometry" can relate to the detection of an analyte-related ion in a solution based on electric current or changes in electric current using an amperometer.

As used herein, the term "coulometry" can relate to a method for determining the amount of an analyte-related substance released in electrolysis by measurement of the quantity of used electricity using a coulometer.

As used herein, the term "resistance measurement" can relate to a method for measuring an analyte-related resistance using an ohmmeter.

As used herein, the term "flow cytometry" can relate to a technique for identifying and sorting cells and their analyte-related components or other particles by staining with a fluorescent dye and detecting the fluorescence usually by laser beam illumination or other optical illumination using a flow cytometer.

As used herein, the term "coulter method" can relate to a technique of sizing and counting analyte-related particles which is based on measurable changes in electrical impedance produced by nonconductive particles suspended in an electrolyte using a coulter counter.

As used herein, the term "radiometry" can relate to techniques for measuring analyte-related electromagnetic radiation, including visible light using a radiometer. Radiometric techniques in optics characterize the distribution of the radiation's power in space, as opposed to photometric techniques, which characterize the light's interaction with the human eye.

As used herein, the term "imaging method" can relate to techniques for representing or reproducing of an analyte-related object's form or structure using an imaging device which may comprise an optical aperture and a camera.

As used herein, the term "mass spectrometry" can relate to a technique that ionizes analyte-related chemical species and sorts the ions based on their mass-to-charge ratio using a mass spectrometer.

As used herein, the term "visual inspection" can relate to an investigation of an analyte-related detectable signal using the human sense of sight.

As used herein, the term "gravimetry" can relate to a method for the measurement of an analyte-related weight, gravitational field, or density using a gravimeter.

As used herein, the term "thermometry" can relate to a method for measuring an analyte-related temperature using a thermometer or thermistor.

As used herein, the term "chemical test reaction" can relate to a chemical reaction such as a precipitation, a complex formation, a redox reaction, or an acid-base reaction that qualitatively or quantitatively indicates the presence of an analyte-related ion or group of elements using a test reagent comprising a substance or solution that reacts with a certain analyte-related substance in a distinctive way in order to generate a product which is usually characteristically colored or clouded.

As used herein, the term "immunological test reaction" can relate to a reaction for measuring the presence or concentration of an analyte-related macromolecule or an analyte-related small molecule in a solution through the use of a specific antibody (usually) or an antigen (sometimes). Test reagents for immunological test reactions may comprise antibodies or antigens capable of specifically binding to analyte-related macromolecules or small molecules. The test reagent may further comprise auxiliary components.

As used herein, the term "enzymatic test reaction" can relate to a reaction for measuring the presence or concentration of an analyte-related substance via specific enzymes or for determining analyte-related enzyme activities. Test reagents for enzymatic test reactions may comprise enzymes or enzyme conjugates and if required coenzymes and/or other auxiliary components.

As used herein, the term "molecular biological test reaction" can relate to a reaction for extracting, purifying, amplifying, separating, immobilizing, hybridizing, and/or cleaving of analyte-related nucleic acids such as DNA or RNA. Test reagents for molecular biological test reactions may comprise DNA or RNA processing enzymes such as polymerases, ligases, restriction endonucleases, or reverse transcriptases and may further comprise auxiliary components.

As used herein, the term "dye staining" can relate to a reaction between cellular materials and dyes for the qualitative and/or quantitative determination of structural details of cells. Test reagents for dye staining may comprise one or more dyes and auxiliary components.

As used herein, the term "coagulation test reaction" can relate to a reaction or process of a liquid, especially blood, changing to a solid or semi-solid state. Coagulation test reactions are used to measure the blood's ability to clot and how long it takes to clot. Frequently ordered laboratory tests which are based on coagulation test reactions are prothrombin time (PT), activated partial thromboplastin time (aPTT), and thrombin time (TT). Test reagents for coagulation test reactions may comprise an activator which triggers the coagulation test reaction, e.g., calcium ions or thrombin. The test reagent may further comprise auxiliary components and/or reactants.

As used herein, the term "agglutination test reaction" can relate to a reaction between a particulate antigen and an antibody which results in a visible clumping of particles (such as red blood cells or bacteria). Test reagents for agglutination test reaction may comprise agglutinins which are known to produce such reactions such as calcium ions and may further comprise auxiliary components.

The laboratory system can further comprise at least one laboratory instrument comprising at least one separation station. As used herein, the term "separation station" can relate to a module or composition of the laboratory instrument comprising one or multiple separation devices. The separation device(s) can either independently or in combination with other separation device(s) separate a test sample from the solid surface of a separation vessel on which the capturing molecule and interfering substance are immobilized. The term "separation" as used herein can mean that a test sample comprising an analyte of interest and the interfering substance are physically isolated from each other. The operation area of such a separation device may not be restricted to the separation station but may also assume functions or operations outside the separation station. For example, the separation device may be a pipetting device which can be capable of separating a test sample from the solid surface of a separation vessel in the separation station as described further below and which can be capable of performing pipetting operations outside the separation station, e.g., pipetting operations like aliquoting of a test sample or transferring a defined volume of a test samples from a test sample vessel located outside the separation station to a separation vessel located at the separation station.

The separation station may further comprise one or more holders configured to receive separation vessels. And each holder may comprise one or multiple insertion areas for inserting one or multiple separation vessels. The holder may comprise a heating and/or cooling device so that certain method or processing steps required for separating an interfering substance from the test sample like for example incubation steps which support an efficient binding between the capturing molecule and the interfering substance can directly be conducted in the separation station. Alternatively, the separation device(s) of the separation station may comprise one or more holders configured to receive one or multiple separation vessels. And each holder may comprise one or multiple insertion areas for inserting one or multiple separation vessels.

In one embodiment of the laboratory system, the at least one separation station can comprise at least one separation device. And the at least one separation device can be selected from a group comprising a pipetting device, a centrifuge, a rotor, a magnetic separation and incubation station, a filtration station, or combinations thereof.

As used herein, the term "pipetting device" can relate to a device configured to conduct pipetting operations like the aspiration and/or dispensation of test samples, separation solutions comprising capturing molecules, or reagents out of and/or into a separation vessel or test sample vessel. The pipetting device either couples disposable pipette tips or comprises pipetting needles. The pipetting device can comprise a single pipette or multiple pipettes. Such pipetting devices are well known in the art and may be designed as described in WO2017064089A1, reference number 100 in FIGS. 1-14 and corresponding description, which is hereby incorporated by reference. The pipetting device may aspirate a defined volume of a test sample from a test sample vessel and may dispense the defined volume of the test sample into the separation vessel. The pipetting device may separate a test sample contained in a separation vessel from the solid surface of the separation vessel by pipetting the test sample out of the separation vessel and transferring it into a test sample vessel.

The term "centrifuge" as used herein can relate to a device with a rapidly rotating holder that applies centrifugal force to a test sample contained in a separation vessel inserted in the holder. Depending on the used separation vessel, the centrifuge can either independently or in combination with a pipetting device separate a test sample from the solid surface of a separation vessel on which the capturing molecule and interfering substance are immobilized. For example, if a separation vessel with a removable filter coated with capturing molecules or linker molecules is used, after centrifugation the filter comprising the immobilized capturing molecule and interfering substance can be removed so that the separation vessel can further be used as a test sample vessel. Thus, no additional separation device may be required for separation. If a separation vessel with coated beads is used, after centrifugation the test sample has to be separated from the generated film of beads at the bottom of the separation vessel comprising the immobilized capturing molecule and interfering substance using a pipetting device. In this case, the centrifuge can contribute or support the separation of the test sample from the interfering substance rather than conducting the separation as such.

The centrifuge may comprise an integrated heating and/or cooling device so that certain method or processing steps like for example incubation step(s) can directly be conducted in the centrifuge. Such centrifuges are well known in the art.

The term "rotor" as used herein can relate to a device configured to spin or rotate a rotatable separation vessel as described above. The rotor can comprise a holder or adaptor for holding the separation vessel. The rotor may be driven by a rotary actuator to allow a controlled circular motion of the separation vessel. Thereby, the separation vessel is rotated about its longitudinal axis. Such a rotor may be designed as described in EP3174970A1, reference number 102 in FIGS. 1, 2D and corresponding description, which is hereby incorporated by reference. Depending on the used separation vessel, the rotor can either independently or in combination with a pipetting device can separate a test sample from the solid surface of a separation vessel on which the capturing molecule and interfering substance are immobilized. For example, if a rotatable separation vessel with a removable lateral chamber coated with capturing molecules is used, after rotation the lateral chamber comprising the immobilized capturing molecule and interfering substance can be removed from the lower portion comprising the test sample so that the lower part of the rotatable separation vessel can be used as a test sample vessel. Thus, no additional separation device may be required for separation. If a rotatable separation vessel with coated side wall(s) is used, after rotation the test sample has to be separated from the immobilized interfering substance at the side wall(s) of the separation vessel using a pipetting device. In this case, the rotor can contribute or support the separation of the test sample from the interfering substance rather than conducting the separation as such.

As used herein, the term "magnetic separation and incubation station" can relate to a device adapted to immobilize magnetic particles or beads present in a liquid test sample on the solid surface of a separation vessel. The magnetic separation and incubation station can comprise a holder or adaptor for inserting a separation vessel or a multi-separation vessel assembly. The magnetic separation and incubation station can further comprise movable magnets which can be connected to an actuator. The actuator can be configured to move the movable magnets into proximity or away from the separation vessel(s). The magnetic separation and incubation station can further comprise a heat block. The heat block can be configured to contact the separation vessel(s) in order to transfer heat to the content(s) of the separation vessel(s). This may support an efficient binding between the capturing molecule and the interfering substance and/or between the capturing molecule and linker molecule. The magnetic separation and incubation station may be designed as described in EP3213819A1, reference number 40 in FIG. 5, 6, 8 and corresponding description, and which is hereby incorporated by reference. Depending on the used separation vessel, the magnetic separation and incubation station can either independently or in combination with a pipetting device separate a test sample from the solid surface of a separation vessel on which the capturing molecule and interfering substance are immobilized. For example, if a separation vessel with coated magnetic beads and an uncoated removable filter with a pore diameter smaller than the coated magnetic beads is used, after applying a magnetic field the filter comprising the immobilized capturing molecule and interfering molecule can be removed so that the separation vessel can be used as a test sample vessel. Thus, no additional separation device may be required for separation. If a separation vessel with only coated magnetic beads is used, after applying a magnetic field the test sample has to be separated from the generated film of magnetic beads at the bottom of the separation vessel comprising the immobilized capturing molecule and interfering substance using a pipetting device. In this case, the magnetic separation and incubation station can contribute or support the separation of the test sample from the interfering substance rather than conducting the separation as such.

As used herein, the term "filtration station" can relate to a device configured to pass a test sample through a coated filter of a separation vessel in order to separate the test sample from the immobilized capturing molecule and interfering substance. The filtration station may comprise a holder or adaptor for holding a separation vessel or multi-separation vessel assembly. The holder may position the separation vessel comprising a coated filter in the three-dimensional space so that the test sample may be applied/pipetted on the filter and passes through the filter by gravity. Alternatively, the filtration station may further comprise a pump which can be operatively coupled to the separation vessel so that a controlled pressure or suction on the test sample can be applied in order to pass the test sample through a coated filter of the separation vessel and thereby retaining interfering substances contained in the test sample by the immobilized capturing molecules on the filter. Such filtration stations are well known in the art.

In one embodiment of the laboratory system, the laboratory instrument can further comprise at least one test sample processing device. And the test sample processing device can be selected from a group comprising a pipetting device, a heating device, a cooling device, a mixing device, a shaking device, a vessel handler, or combinations thereof.

As used herein, the term "test sample processing device" can relate to a device configured to conduct processing step(s) or operation(s) on a test sample according to an interference separation protocol as described further below. The test sample processing device of the laboratory may also assume functions or operations in the separation station. For example, the test sample processing device may be a pipetting device which can be capable of performing pipetting operations outside the separation station (e.g., aliquoting of a test sample, adding separation solution to a test sample, aspirating a test sample to be transferred to the separation station) and inside the separation station (e.g., dispensing the test sample into a separation vessel, adding separation solution to a test sample, separating a test sample from the solid surface of a separation vessel).

As used herein, the term "heating device" can relate to a device configured to heat a test sample at a defined temperature for a defined time duration. Such heating devices are well known in the art.

The term "cooling device" as used herein can relate to a device configured to cool a test sample at a defined temperature for a defined time duration. Such heating devices are well known in the art.

In one embodiment, the heating device and the cooling device may be combined in one incubation device which can be configured to heat and cool a test sample at defined temperatures for defined time durations. Such incubation devices are well known in the art.

As used herein, the term "mixing device" can relate to a device configured to mix or stir a test sample at a defined speed for a defined time duration. Alternatively, the mixing device can also comprise a heating, cooling or incubation device so that the test sample can be mixed and stirred at predefined temperatures. Such mixing devices are well known in the art.

As used herein, the term "shaking device" can relate to a device configured to shake a test sample at a defined speed for a defined time duration. Alternatively, the shaking device can also comprise a heating, cooling or incubation device so that the test sample can be shook at predefined temperatures. Such shaking devices are well known in the art.

The term "vessel handler" as used herein can relate to a device configured to position or insert a separation vessel or test sample vessel at a defined position within the laboratory instrument. The vessel handler can hold and move the vessels within the laboratory instrument. For example, the vessel handler may position a separation vessel in a designated holder position of the separation device or sample output area of the laboratory instrument. The vessel handler may comprise a vessel rotor or a robotic arm equipped with grippers. Such devices for handling and positioning vessels within a laboratory instrument are well known in the art and may be designed as described in EP2148204B1, reference number 310 in FIGS. 3, 4, and corresponding description, which is hereby incorporated by reference. In one embodiment, the vessel handler may further be configured to remove and/or fit a cap on a vessel. Such vessel handlers are well known in the art and may be designed as described in U.S. Pat. No. 8,834,814B2 or as described in EP2538227B1, which are hereby incorporated by reference.

In a specific embodiment of the laboratory system, the at least one test sample processing device can be comprised by the at least one separation station. For example, separation vessel holders of the separation station may comprise a heating, cooling, mixing, and/or shaking device so that certain method or processing steps required for separating an interfering substance from the test sample like, for example, incubation steps which support an efficient binding between the capturing molecule and the interfering substance can directly be conducted in the separation station.

In one embodiment of the laboratory system, the test sample contained in the at least first separation vessel can be a first test sample type and the test sample contained in the at least second separation vessel can be a second test sample type. And the first test sample type can be different from the second test sample type.

Interferences may also be test sample type dependent. Some test sample types can comprise well known interfering substances which interfere with corresponding laboratory tests. For example, human anti-animal antibodies are known interfering substances present in serum test samples and/or plasma test samples and may interfere with laboratory tests which are based on immunological test reactions. Such interferences may be separated from the serum or plasma test samples using separation vessels with solid surfaces coated with corresponding antibodies. Fibrin is a known interfering substance present in plasma test samples and may be separated from the plasma test sample using a separation vessel comprising a solid surface coated with anti-fibrin antibodies. For urine test samples, vitamin C (ascorbic acid) is a known interfering substance which may be separated from the urine test sample using a separation vessel comprising a solid surface coated with anti-vitamin C antibodies. Another example is uric acid which is an interfering substance in stool test samples and may be separated from the stool test sample using a separation vessel comprising a solid surface coated with anti-uric acid antibodies.

In a more specific embodiment, the test sample type can be selected from a group comprising a serum test sample, plasma test sample, whole blood test sample, urine test sample, stool test sample, sputum test sample, cerebrospinal fluid test sample, and/or bone marrow test sample.

In one embodiment of the laboratory system, the laboratory instrument can further comprise a test sample input area. As used herein, the term "test sample input area" can relate to a dedicated area of the laboratory instrument where test samples to be processed by the laboratory instrument are temporarily positioned prior further transportation to the at least one separation station. The test sample input area may comprise at least one holder or rack for manually inserting one or multiple test sample vessels containing the test sample. Alternatively, the test sample input area may comprise a holder or rack conveyor which can be capable of being operatively coupled to a laboratory transport system for receiving holders or racks with test sample vessels from the laboratory transport system. Or the test sample input area may comprise a part of the laboratory transport system.

In one embodiment of the laboratory system, the laboratory instrument can further comprise a test sample output area. The test sample output area can be operatively coupled to a laboratory transport system and the laboratory transport system can be operatively coupled to at least a first and a second analytical module. And the first analytical module can be different from the second analytical module.

As used herein, the term "test sample output area" can relate to a dedicated area of the laboratory instrument where test samples processed by the laboratory instrument are temporarily positioned prior further transportation to connected analytical modules. In one embodiment, the test sample output area may comprise at least one holder or rack for inserting one or multiple separation vessels or test sample vessels containing the processed test sample. The test sample output area may comprise a holder or rack conveyor which can be capable of being operatively coupled to the laboratory transport system. Accordingly, the laboratory transport system can receive holders or racks with separation vessels or test sample vessels from the test sample output area. Alternatively, the test sample output area may comprise a part of the laboratory transport system.

In one embodiment, the test sample output area may comprise a gate through which a user can remove or unload holders or racks with separation vessels or test sample vessels for further manual transportation of the processed test samples. The manual unloading may be advantageous in semi-automated laboratory environments where the different analytical modules are not operatively coupled to a laboratory transport system.

As used herein, the term "laboratory transport system" can relate to a system designed to transport or distribute test samples to connected pre-analytical stations, analytical modules or post-analytical stations. The laboratory transport system may comprise a transport plane on which holders or racks with separation vessels or test sample vessels can be transported. The laboratory transport system may comprise a conveyor belt to move the holders or racks. Alternatively, the laboratory transport system may comprise a number of electro-magnetic actuators stationarily arranged below the transport plane and adapted to generate magnetic fields to move the holders or racks. Alternatively, the laboratory transport system may comprise a stable transport plane on which self-propelled holders or racks can move.

A pre-analytical station can usually be used for the preliminary processing of test samples or sample vessels. An analytical module can be designed, for example, to use a test sample or part of the test sample and a test reagent in order to produce a measurable signal, on the basis of which it is possible to determine whether the analyte is present, and if desired in what concentration. Multiple analytical modules may be combined in one analytical station so that laboratory tests of different analytical methods can be performed on the same analytical station. A post-analytical station can usually be used for the post-processing of test samples like the archiving of test samples. The pre-analytical station, analytical module and post-analytical stations may comprise, for example, at least one device from the group of following devices: a sorting device for sorting test samples or test sample vessels, a cap removal device for removing caps or closures on test sample vessels, a cap fitting device for fitting caps or closures on test sample vessels, a cap removal/fitting device for removing/fitting caps or closures on test sample vessels, a pipetting device for pipetting a test sample and/or test reagent, an aliquoting device for aliquoting test samples and/or test reagents, a centrifuging device for centrifuging test samples and/or test reagents, a heating device for heating a test sample and/or test reagent, a cooling device for cooling a test sample and/or test reagent, a mixing device for mixing a test sample and/or test reagent, an isolation device for isolating an analyte of the test sample (e.g., chromatograph or electrophoresis device), a storing device for storing test samples and/or test reagents, an archiving device for archiving test samples and/or test reagents, a test sample vessel type determination device for determining a test sample vessel type, a test sample quality determination device for determining a test sample quality, a test sample vessel identification device for identifying a test sample vessel, a detection device for detecting the analyte of a test sample such as a photometer, a spectrometer, a fluorometer, a turbidimeter, a nephelometer, a luminometer, a fluorescence polarimeter, a flame photometer, an atomic absorption photometer, a potentiometer, an ion-selective electrode, a amperometer, a coulometer, an ohmmeter, a flow cytometer, a coulter counter, a radiometer, a camera, a mass spectrometer, a gravimeter, a thermometer, thermistor, or combinations thereof. Such pre-analytical stations, analytical modules, post-analytical stations, and devices are well known in the art.

In one embodiment of the laboratory system, the first analytical module can be configured to conduct a laboratory test of a first analytical method and the second analytical module can be configured to conduct a laboratory test of a second analytical method. Accordingly, the first and the second analytical module can comprise either different detection devices or the same detection devices and different test reagents for conducting laboratory tests of two different analytical methods as described above.

In one embodiment of the laboratory system, the laboratory instrument can further comprise a control unit. The control unit can comprise a processor and a computer-readable medium provided with at least a first and a second interference separation protocol. The first interference separation protocol can comprise at least one processing step to separate a test sample contained in the at least first separation vessel from an interfering substance of a laboratory test of a first analytical method and the second interference separation protocol can comprise at least one processing step to separate a test sample contained in the at least second separation vessel from an interfering substance of a laboratory test of a second analytical method. The processor can be configured to control the laboratory instrument according to the at least first and second interference separation protocol.

The term "control unit" as used herein can encompass any physical or virtual processing device comprising a processor which can be configured to control the laboratory instrument in a way that test samples are processed according to interference separation protocols. The control unit may receive information or orders from a management unit regarding test samples which need to be processed on the laboratory instrument according to assigned interference separation protocols and time schedules. The processor of the control unit may control the at least one separation station of the laboratory instrument according to the assigned interference separation protocols. The control unit may further control the at least one test sample processing device. The processor of the control unit may, for instance, be embodied as a programmable logic controller adapted to execute a computer-readable program stored on a computer-readable medium provided with instructions to perform an interference separation protocol in order to separate a test sample contained in a separation vessel from an interfering substance. The control unit may further comprise a user interface for directly entering information or orders regarding test samples which need to be processed on the laboratory instrument. Furthermore, a user may assign interference separation protocols to test samples or may configure processing step(s) of the interference separation protocols at the user interface of the control unit.

As used herein, the term "interference separation protocol" can relate to a predefined procedure or process for separating interfering substances contained in test samples. The interference separation protocol may comprise multiple processing steps and define the timing and/or sequence of the processing step(s). A processing step in turn may define which and how an operation needs to be conducted with a test sample, separation solution, or separation mixture. Thus, a processing step may define which separation device and/or sample processing device, which device parameters such as for example time, speed, temperature, and which separation vessel is used for separating an interfering substance contained in a test sample.

Non-limiting examples of such processing steps can be the aspiration and/or dispensation of a test sample or separation solution with dissolved capturing molecules out of and/or into a separation vessel using a pipetting device, the incubation of a test sample or separation mixture comprising a test sample and a separation solution at a defined temperature for a defined time duration using an incubation device, the centrifugation of a test sample or separation mixture at a defined speed and temperature for a defined time duration using a centrifuge, the spin of a test sample or separation mixture at a defined speed and temperature for a defined time duration using a rotor, the exposure of a test sample or separation mixture to an electric field for a defined time using a magnetic separation and incubation station, the filtration of a test sample or separation mixture at a defined pressure using a filtration station, the heating of a test sample or separation mixture at a defined temperature for a defined time duration using a heating device, the cooling of a test sample or separation mixture at a defined temperature for a defined time duration using a cooling device, the mixing of a test sample or separation mixture at a defined speed and temperature for a defined time duration using a mixing device, the shaking of a test sample or separation mixture at a defined speed and temperature for a defined time duration using a shaking device, the positioning or insertion of a separation vessel or test sample vessel at a defined position of the separation station or test sample output area using a vessel handler.

In one embodiment of the laboratory system, the computer-readable medium can store at least a first and a second interference separation protocol. Each interference separation protocol may comprise a predefined sequence of processing steps. And at least one processing step of the first interference separation protocol can differ from the second interference separation protocol.

A non-limiting example of a first interference protocol for removing the interfering substance biotin may comprise the following processing steps:
- insert a separation vessel coated with avidin or streptavadin into a holder of the separation station using the vessel handler;
- insert a test sample vessel into a holder of the sample output area using the vessel handler;
- dispense a defined volume of the test sample into the separation vessel using the pipetting device;
- incubate the test sample for a defined time at a defined temperature using the incubation device of the separation station;
- aspirate the test sample out of the separation vessel using the pipetting device; and
- dispense the test sample into the test sample vessel using the pipetting device.

A non-limiting example of a second interference protocol for removing the interfering substance hemoglobin may comprise the following steps:
- insert a separation vessel comprising magnetic beads coated with HemogloBind™ into a magnetic separation and incubation station holder of the separation station using the vessel handler;
- insert a test sample vessel into a holder of the sample output area using the vessel handler;
- dispense a defined volume of the test sample into the separation vessel using the pipetting device;
- incubate the test sample for a defined time at a defined temperature using the magnetic separation and incubation station;
- apply a magnetic field of a defined strength and for a defined time to the separation vessel using the magnetic separation and incubation station of the separation station;
- aspirate the test sample out of the separation vessel using the pipetting device; and
- dispense the test sample into the test sample vessel using the pipetting device.

In one embodiment, the processing step(s) of an interference protocol can be configurable. The requirements of a laboratory system for separating interfering substances contained in test samples may depend on the laboratory test portfolio and installed analytical modules and may vary from laboratory to laboratory. Therefore, the user can define for each interference protocol, the required separation device and/or sample processing device and configure the device parameters such as for example time, speed, temperature, and which separation vessel is used for separating an interfering substance contained in a test sample.

In one embodiment of the laboratory system, the laboratory system can further comprise a data base. The data base can comprise at least one test sample record, wherein the test sample record can comprise a test sample identity and at least one test sample attribute. And at least one of the at least one test sample attribute can be a selective test sample attribute. The laboratory system can further comprise a management unit which can be communicatively connected to the laboratory instrument. The management unit can comprise a processor and a computer-readable medium provided with instructions to select a test sample based on the at least one selective test sample attribute, to assign an interference separation protocol to the selected test sample, and to send an order to the laboratory instrument based on the selected test sample and assigned interference separation protocol.

As used herein the term "test sample attribute" can relate to information and/or characteristics associated with a specific test sample or test sample group. Information associated with a test sample are, as non-limiting examples, test sample type, test sample expiration date, test sample volume, ordered laboratory test for the test sample, patient information, already available test results from previous laboratory tests, flags indicating invalid test result and/or clinically inconsistent result of the test sample. If a test sample attribute meets a certain predefined condition, it may be a "selective test sample attribute" on the basis of which a test sample is selected for applying an interference separation protocol on the laboratory instrument. Thus, instructions for selecting a test sample based on one selective test sample attribute may comprise if-then rules. For example, if a test sample comprises a certain test sample attribute which fulfills a certain condition, then this test sample is selected, an interference separation protocol is assigned to the selected test sample, and the assigned interference separation protocol is conducted on the selected test sample on the laboratory instrument. As the laboratory instrument of the laboratory system for separating interfering substances may be connected to multiple different analytical modules, the targeted selection of test samples for applying an interference separation protocol on the laboratory instrument may assure that the throughput of the laboratory instrument is not the limiting factor of the throughputs of all connected analytical modules.

In a more specific embodiment, the at least one selective test sample attribute can be selected from a group comprising a laboratory test ordered for the test sample, patient information associated with the test sample, an invalid test result and/or clinically inconsistent result of the test sample.

As interferences may be analyte dependent and/or test reagent dependent and some laboratory tests are more susceptible for interferences than other laboratory tests, the selection of the test sample can be based on the laboratory test ordered for the test sample. Thus, the selection of test sample may be laboratory test specific. Interference related information of laboratory tests such as known interfering substance(s) and susceptibility to interfering substance(s) may be provided by the laboratory test provider or manufacturer. The condition of a test sample attribute to be a selective test sample attribute may be whether the ordered laboratory test has known interfering substances and/or is susceptible for interfering substances. For example, all test samples for which a TSH laboratory test is ordered may be selected and an interference separation protocol for separating the interfering substance biotin may be conducted on the laboratory instrument for the selected samples.

The term "patient information" as used herein can relate to one or more patient attributes or information associated with a certain patient. Non-limiting examples of such patient information are age, gender, actual and/or past medications/therapies, actual and/or past diets, actual and/or past work environments, and time of sampling. This information can be used to select a test sample for applying an interference separation protocol on the test sample. Patient information may provide indicators that a certain patient may have an elevated or high level of an endogenous and/or exogenous interfering substance. Interference related patient information such as known medications or diets which may trigger elevated levels of interfering substances or introduce interfering substance(s) may be provided by a physician. Thus, the condition of a test sample attribute to be a selective test sample attribute may be whether a patient has undergone a certain therapy, had a certain diet, or was exposed to any environment or condition triggering elevated levels of interfering substances or introducing interfering substances. For example, test samples from patients with dietary supplement intake may be selected and an interference separation protocol may be conducted on the laboratory instrument for the selected samples in order to separate the interfering substance biotin. Or test samples from patients exposed to ruthenium (e.g., working in the dying process of clothes) may be selected and an interference separation protocol may be conducted on the laboratory instrument for the selected samples in order to separate the interfering substance ruthenium.

As used herein, the term "invalid test result" can relate to a test result of a prior laboratory test and which is already available for a certain test sample and did not fulfill certain test result validation criteria such as for example predefined analyte ranges. Such invalid test results may indicate the presence of an interfering substance in a test sample for the conducted laboratory test. Invalid test results may be provided by an analytical module which conducted the prior laboratory test result. Thus, the condition of a test sample attribute to be a selective test sample attribute may be a test result which is outside of a validity range. A test sample with an invalid test result may be selected and an interference separation protocol may be conducted on the laboratory instrument for the selected sample prior retesting of the test sample.

As used herein, the term "clinically inconsistent result" can relate to a test result or medical finding which does not fit into the differential diagnosis of a certain condition of the patient. Such clinically inconsistent results may indicate that a certain patient may have an elevated or high level of an endogenous and/or exogenous interfering substance. Thus, the condition of a test sample attribute to be a selective test sample attribute may be whether a test result or medical finding does not fit into the differential diagnosis. For example, if the level of a thyroid parameter (fT4) does not fit with other determined levels of thyroid parameters (TSH or fT3), the corresponding test sample may be selected and an interference separation protocol may be conducted on the laboratory instrument for the selected sample prior retesting of the test sample.

In one embodiment, a user may select manually a test sample to be processed based on information that is not or not yet stored in the database. For example, a user may receive an urgent test sample and a datasheet comprising test sample attributes for the urgent test sample from a physician. Based on the sample tube attributes, the user may then determine whether an interference separation protocol has to be assigned to the test sample and conducted on the laboratory instrument. The selection of the test sample, the assignment of the interference separation protocol, and the order to the laboratory instrument may be entered by a user at the user interface of the laboratory instrument or management unit.

In another embodiment, no selections of test samples based on selective test sample attributes are conducted and an interference separation protocol may be performed on the laboratory instrument for all test samples. For example, in a highly specialized laboratory environment where the laboratory test portfolio comprises only a few laboratory tests, no selection of individual test samples based on a selective sample attributes may be required.

In a further embodiment of the laboratory system, the laboratory instrument can further comprise at least a first separation vessel storage section and second separation vessel storage section. The first separation vessel storage section and second separation vessel storage section can be separated from each other. And the at least first separation vessel can be stored in the at least first separation vessel storage section and the at least second separation vessel can be stored in the at least second separation vessel storage section. Thus, separation vessels for separating interfering substances of a laboratory test of a first analytical method and separation vessels for separating interfering substances of a laboratory test of a second analytical method may be stored spatially separated from each other in order to minimize possible cross-contaminations.

As used herein, the term "storage section" can relate to a cabinet of various sizes which is able to store a plurality of separation vessels. The at least first and second storage section may be physically separated within the laboratory instrument and independent from each other. Alternatively, the at least first and second storage section may be comprised by one central storage station of the laboratory instrument and the first and second separation vessel storage sections can be separated by designated areas and/or partition walls within the storage station. Each storage section or the storage station may have a tempering unit to hold the ambient temperature for the separation vessels within the storage section below room temperature. In the interior, each storage section or the storage station may comprise a plurality of shelves or racks for storing of a high number of separation vessels in predefined storage positions. Each storage section or the storage station may further have, in addition, or alternatively, to shelves, compartmented trays or inserts for separation vessels. Further, shelves or compartments with different heights may be provided in order to be able to optimize available space when storing separation vessel of different sizes and geometries. Separation vessels may be loaded/unloaded into/out of each storage section or the storage unit manually and/or automated, e.g., using a vessel handler. For example, the user may load a storage section with a specific type of separation vessel manually. Then, a vessel handler may transfer the separation vessel from the storage section to the separation station using the vessel handler.

The present invention can also relate to a method for separating interfering substances contained in test samples. The method comprises the following steps:
  a) selecting at least a first test sample based on at least one selective test sample attribute;
  b) combining together the first test sample with a solid surface and capturing molecule of a first separation vessel for a period of time and under conditions sufficient to permit an interfering substance of a laboratory test of a first analytical method to be bound to the capturing molecule or sufficient to permit an interfering substance of a laboratory test of a first analytical method to be bound to the capturing molecule and the capturing molecule to be immobilized on the solid surface of the first separation vessel;
  c) separating the at least first test sample from the solid surface of the first separation vessel;

d) selecting at least a second test sample based on at least one selective test sample attribute;

e) combining together the second test sample with a solid surface and capturing molecule of a second separation vessel for a period of time and under conditions sufficient to permit an interfering substance of a laboratory test of a second analytical method to be bound to the capturing molecule or sufficient to permit an interfering substance of a laboratory test of a second analytical method to be bound to the capturing molecule and the capturing molecule to be immobilized on the solid surface of the second separation vessel; and f) separating the at least second test sample from the solid surface of the second separation vessel, wherein step a) is executed before, after, or at the same time of step d) and a step sequence comprising the steps b) and c) is executed before, after, or at the same time of a step sequence comprising the steps e) and f). And the first analytical method is different from the second analytical method.

In one embodiment of the method, the selection of the at least first test sample in step a) and/or the selection of the at least second test sample in step d) of the method may be conducted by a user manually at the user interface of the laboratory instrument or management unit or by a processor executing instructions stored on a computer-readable medium to select a test sample based on the at least one selective test sample attribute as described above. The timing of step a) can be independent of the timing of step d). Thus, step a) can be executed before, after, or at the same time of step d). For example, a user may select a first test sample at the user interface of the laboratory instrument and at the same time the management unit selects a second test sample based on the at least one selective test sample attribute stored in the data base.

In a more specific embodiment of the method, the at least one selective test sample attribute can be selected from a group comprising a laboratory test ordered for the test sample, patient information associated with the test sample, an invalid test result and/or clinically inconsistent result of the test sample as described above.

In one embodiment of the method, the step sequence comprising the steps b) and c) can always be executed after step a) and the step sequence comprising the steps e) and f) can be always executed after the method step d). And the step sequence comprising the steps b) and c) may be executed before or after the step sequence comprising the steps e) and f). Depending on the configuration of the laboratory instrument, only one separation station may be available. Therefore, the step sequence comprising the steps b) and c) may only be executed before or after the step sequence comprising the steps e) and f) but not at the same time.

In a further embodiment of the method, the timing of the step sequence comprising steps b) and c) can be independent from the timing of the step sequence comprising the steps e) and f). Depending on the configuration of the laboratory instrument, multiple separation stations may be available and may operate independently. For example, a first interference protocol assigned to a first sample may be conducted on a first separation station and a second interference protocol assigned to a second sample may be conducted on a second separation station of the laboratory instrument. Accordingly, the step sequence comprising the steps b) and c) may be executed at the same time and independent of the step sequence comprising the steps e) and f).

In one embodiment of the method, steps b) and c) for separating an interfering substance of a laboratory test of a first analytical method from a first test sample can be conducted according to a first interference separation protocol and the steps e) and f) for separating an interfering substance of a laboratory test of a second analytical method from a second test sample can be conducted according to a second interference separation protocol stored on the control unit of the laboratory instrument. Steps b), c), e) and f) of the method may comprise one or multiple processing steps of the first and second interference separation protocol. For example, step b) and e) may comprise the positioning or insertion of a separation vessel and test sample vessel at defined positions using a vessel handler, the aspiration and/or dispensation of a test sample, separation solution with dissolved capturing molecules, or reagent out of and/or into a separation vessel, the incubation of a test sample or separation mixture comprising a test sample and a separation solution at a defined temperature for a defined time duration, the heating of a test sample or separation mixture at a defined temperature for a defined time duration using a heating device, the cooling of a test sample or separation mixture at a defined temperature for a defined time duration using a cooling device, the mixing of a test sample or separation mixture at a defined speed and temperature for a defined time duration using a mixing device, the shaking of a test sample or separation mixture at a defined speed and temperature for a defined time duration. For example, step c) and e) may comprise the centrifugation of a test sample or separation mixture at a defined speed and temperature for a defined time duration, the spin of a test sample or separation mixture at a defined speed and temperature for a defined time duration, the exposure of a test sample or separation mixture to an electric field for a defined time, the filtration of a test sample or separation mixture at a defined pressure, the aspiration of a test sample out of the a separation vessel using a pipetting device.

In one embodiment, the steps a), b), and c) of the method can define a step sequence for separating an interfering substance of a laboratory test of a first analytical method from a first test sample and the steps d), e), and f) of the method can define a step sequence for separating an interfering substance of a laboratory test of a second analytical method from a second test sample, wherein the first analytical method is different from the second analytical method. The step sequence comprising steps a), b), and c) may be executed before, after, or at the same time of the step sequence comprising steps d), e), and f).

In a further embodiment of the method, the first test sample can be transported to a first analytical module after step c) and the second test sample can be transported to a second analytical module after step f). And the first analytical module can be configured to conduct the first analytical method and the second analytical module can be configured to conduct the second analytical method.

In a more specific embodiment of the method, the first test sample can be transported to the first analytical module manually or on a laboratory transport system. And the second test sample can be transported to the second analytical module manually or on a laboratory transport system.

Referring initially to FIG. 1, in FIG. 1, a schematic representation of a laboratory system (10) for separating interfering substances (24, 26) contained in test samples (34, 36) is shown. The shown laboratory system (10) can comprise a first and a second separation vessel (12, 14). Each separation vessel (12, 14) can comprise a solid surface (16, 18) and a capturing molecule (20, 22). The capturing molecule (20) of the first separation vessel (12) can be immobilized on the solid surface (16) of the first separation vessel (12) and configured to bind an interfering substance (24) of a laboratory test of a first analytical method contained in a first test sample (34) located in the first separation vessel (12). The capturing molecule (22) of the second separation vessel (14) can be immobilized on the solid surface (18) of the second separation vessel (14) and configured to bind an interfering substance (26) of a laboratory test of a second analytical method contained in second test sample (36) located in the second separation vessel (14). In the shown embodiment, the first and second separation vessels (12, 14) can be the same, e.g., a rotatable separation vessel, but can comprise different capturing molecules (20, 22) for capturing different interfering substances (24, 26). In an alternative embodiment, the first and second separation vessels may be the same and can comprise capturing molecules for capturing the same interfering substances. In another embodiment, the first and second separation vessels may be different and comprise different capturing molecules for capturing different interfering substances. In a further embodiment, the first and second separation vessels may be different and can comprise the same capturing molecules for capturing the same interfering substances.

The shown laboratory system (10) can further comprise a laboratory instrument (28) comprising a first separation station (30) and a second separation station (32). Each separation station (30, 32) can comprise at least one separation device (31, 33). In the shown embodiment, the first and second separation devices (31, 33) are the same, e.g., a rotor comprising a holder or adaptor for holding the separation vessel (12, 14). The shown laboratory instrument (28) may further comprise a first and second sample processing device (38, 40) such as a pipetting device for aspirating and/or dispensing a test sample and/or a separation solution with dissolved capturing molecules out of and/or into the separation vessels (12, 14) located in the separation stations (30,32) or out of the test sample vessels located in the test sample input area (45). The laboratory instrument may further comprise a test sample output area (46) which can be operatively coupled to a laboratory transport system (48). The separation vessels (12, 14) may be moved from the separation stations (30, 32) to the test sample output area (46) by a vessel handler (not shown). In an alternative embodiment, test samples (34, 36) contained in separation vessels (12, 14) may be transferred to test sample vessels located in the test sample output area (46) using the sample processing devices (38, 40) such as pipetting devices. In the shown embodiment, the laboratory transport system (48) is operatively coupled to a first analytical module (50) and a second analytical module (52), wherein the first analytical module (50) can be different from the second analytical module (52). For example, the first analytical module (50) can be configured to conduct laboratory tests of a first analytical method and the second analytical module (52) can be configured to conduct laboratory tests of a second analytical method.

Figure 3:
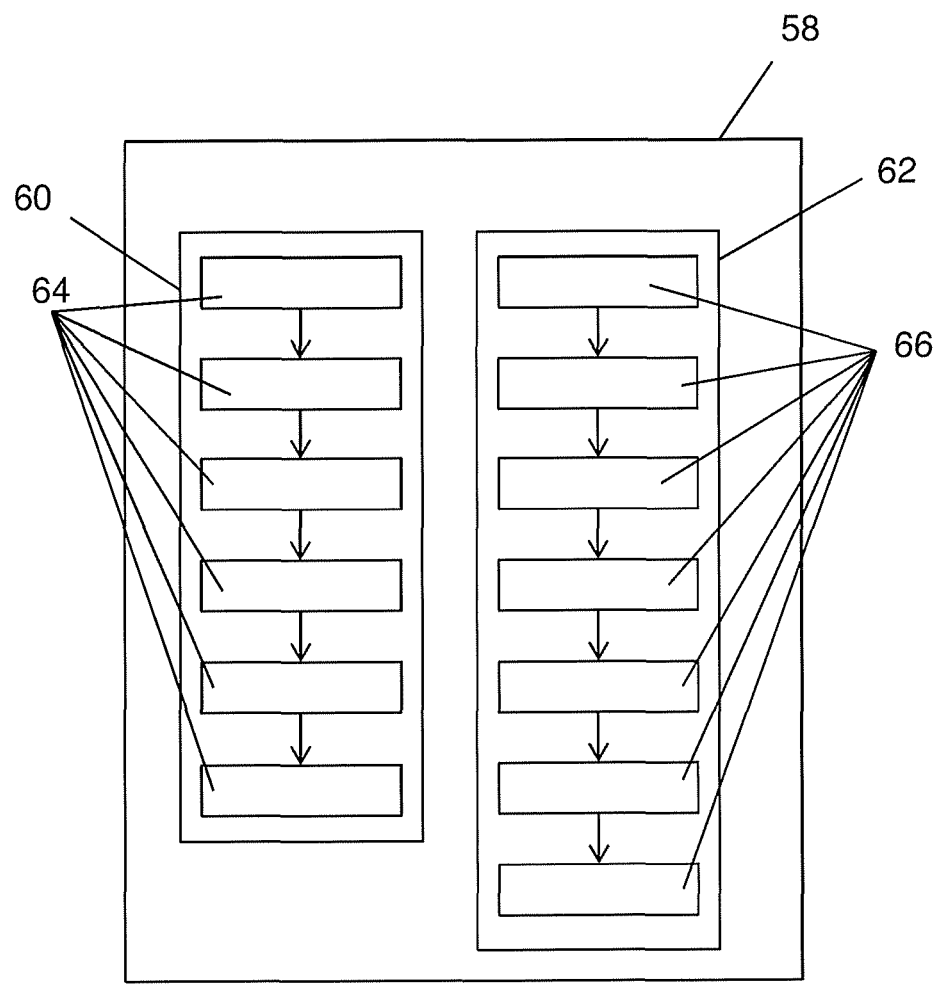
FIG. 3 illustrates a schematic representation of a computer-readable medium provided with a first and second interference separation protocol according to an embodiment of the present disclosure.

The laboratory instrument can further comprise a control unit (54) comprising a processor (56) and a computer-readable medium (58) provided with at least a first and a second interference separation protocol (60, 62) as will be further described in FIG. 3. And the processor (56) can be configured to control the laboratory instrument (28) according to the at least first and second interference separation protocol (60, 62). The control unit (54) may further comprise a user interface (55).

The shown laboratory system can further comprise a data base (68) comprising test sample records (70, 72, 74) as will be further described in FIG. 4 and a management unit (90) communicatively connected to the laboratory instrument (28). The management unit (90) can comprise a processor (94) and a computer-readable medium (96) provided with instructions to select a test sample based on the at least one selective test sample attribute (84, 86, 88), to assign an interference separation protocol (60, 62) to the selected test sample, and to send an order based on the selected test sample and assigned interference separation protocol to the laboratory instrument (28).

FIGS. 2A-D depicts different embodiments of separation vessels (12) comprising solid surfaces (16) and capturing molecules (22). As shown in FIGS. 2A and 2B, the solid surface (16) may be comprised by the inner surface of the separation vessel (12) and the capturing molecule of the separation vessel (12) can be immobilized on the solid surface (16). In a more specific embodiment, the inner surface can be coated with the capturing molecule (FIG. 2A). In another specific embodiment, the inner surface can be coated with a linker molecule (23) capable of binding or capturing the capturing molecule (22) (FIG. 2B). As shown in FIG. 2C, the separation vessel (12) may comprise a filter (42) and the solid surface (16) can be comprised by the filter (42) which can be coated with capturing molecules (22). In a further embodiment as shown in FIG. 2D, the separation vessel (12) can comprise beads (44) and the solid surface (16) can be comprised by the surface of the beads which can be coated with capturing molecules (22). Alternatively, the filter or beads of the separation vessels may be coated with linker molecules capable of binding or capturing the capturing molecule (not shown).

FIG. 3 shows a schematic representation of a computer-readable medium (58) provided with a first interference separation protocol (60) and a second interference separation protocol (62). The first interference separation protocol (60) may be designed for separating the interfering substance biotin from a test sample for which a TSH laboratory test has been ordered. The first interference separation protocol (60) may comprise the following six processing steps (64):

insert a separation vessel coated with avidin or streptavadin into a holder of the separation station using the vessel handler;
insert a test sample vessel into a holder of the sample output area using the vessel handler;
dispense a defined volume of the test sample into the separation vessel using the pipetting device of the separation station;
incubate the test sample for a defined time at a defined temperature using the incubation device of the separation station;
aspirate the test sample out of the separation vessel using the pipetting device of the separation station; and
dispense the test sample into the test sample vessel using the pipetting device of the separation station.

The second interference separation protocol (62) may be designed for separating the interfering substance hemoglobin from a test sample for which a clinical chemistry laboratory test (e.g. iron) has been ordered. The first interference separation protocol (62) may comprise the following seven processing steps (66):

insert a separation vessel comprising magnetic beads coated with HemogloBind™ into a magnetic separation and incubation station holder of the separation station using the vessel handler;

insert a test sample vessel into a holder of the sample output area using the vessel handler;

dispense a defined volume of the test sample into the separation vessel using the pipetting device of the separation station;

incubate the test sample for a defined time at a defined temperature using a magnetic separation and incubation station of the separation station;

apply a magnetic field of a defined strength and for a defined time to the separation vessel using the magnetic separation and incubation station of the separation station;

aspirate the test sample out of the separation vessel using the pipetting device of the separation station; and dispense the test sample into the test sample vessel using the pipetting device of the separation station.

FIG. 4 depicts an example of a data concept of the data base (68) comprising test sample records (70, 72, 74). Each test sample record (70, 72, 74) can comprise a test sample identity (76) and at least one test sample attribute (78, 80, 82). In the shown example, for each test sample record (78, 80, 82) the attributes "Laboratory test ordered for the test sample" (78), "Patient information" (80), and "Invalid test results" (82) can be stored. Furthermore, each test sample record (70, 72, 74) can comprise a test sample attribute (78, 80, 82) which can be a selective test sample attribute (84, 86, 88) on the basis of which a test sample is selected for applying an interference separation protocol (60, 62) on the laboratory instrument. For example, for the test sample with the test sample identity "1" a TSH laboratory test is ordered (84). As it is known that TSH laboratory tests are susceptible for the interfering substance biotin, this test sample can be selected for applying an interference separation protocol (60) for separating the interfering substance biotin on the laboratory instrument. For the test sample with the test sample identity "2" an invalid test result is available (86), e.g., measured iron value is out of range, which may indicate the presence of the interfering substance hemoglobin in the test sample. Accordingly, this test sample can be selected for applying an interference separation protocol (62) for separating the interfering substance hemoglobin on the laboratory instrument. The test sample with the test sample identity "3" originates from a patient who has been undergone a heparin medication (88). Thus, an elevated or high heparin level which may interfere with the ordered PCR based HIV laboratory test can be expected. Therefore, this test sample can be selected for applying an interference separation protocol for separating the interfering substance heparin on the laboratory instrument prior conducting the HIV laboratory test.

FIG. 5A-F depict flowcharts of embodiments of the methods (103) for separating interfering substances contained in test samples including the temporal sequence of each step (104-114) of the method along the time axis (116) of the method. Each of the shown methods (103) for separating interfering substances contained in test samples can comprise six steps (104-114). In step a) (104) of the method, a first test sample (34) can be selected based on at least one selective test sample attribute (84). In step b) (106) of the method, the first test sample (34) can be combined with the solid surface (16) and capturing molecule (20) of a first separation vessel (12) for a period of time and under conditions sufficient to permit an interfering substance (24) of a laboratory test of a first analytical method to be bound to the capturing molecule (20) or sufficient to permit an interfering substance (24) of a laboratory test of a first analytical method to be bound to the capturing molecule (20) and the capturing molecule to be immobilized on the solid surface (16) of the first separation vessel (12). Subsequently, in step c) (108) of the method, the first test sample (34) can be separated from the solid surface (16) of the first separation vessel (12) using at least one separation device (31, 33) of the at least one separation station (30, 32) of the laboratory instrument (28). In step d) (110) of the method, a second test sample (36) can be selected based on at least one selective test sample attribute (86). In step e) (112) of the method, the second test sample (36) can be combined together with the solid surface (18) and capturing molecule (22) of a second separation vessel (14) for a period of time and under conditions sufficient to permit an interfering substance (26) of a laboratory test of a second analytical method to be bound to the capturing molecule (22) or sufficient to permit an interfering substance (26) of a laboratory test of a second analytical method to be bound to the capturing molecule (22) and the capturing molecule (22) to be immobilized on the solid surface (18) of the second separation vessel (14). Subsequently, in step f) (114) of the method, the second test sample (36) can be separated from the solid surface (18) of the second separation vessel (14). As shown in FIG. 5A, step a) (104) can be executed before step d) (110) and a step sequence comprising steps b) (106) and c) (108) can be executed before a step sequence comprising steps e) (112) and f) (114). As shown in FIG. 5B, step a) (104) can be executed after step d) (110) and the step sequence comprising steps b) (106) and c) (108) can be executed after the step sequence comprising steps e) (112) and f) (114). Step a) (104) can also be executed at the same time of step d) (110) as shown on FIG. 5C and then the step sequence comprising steps b) (106) and c) (108) can be executed before the step sequence comprising steps e) (112) and f) (114). Of course, the step sequence comprising steps b) (106) and c) (108) can also be executed after the step sequence comprising steps e) (112) and f) (114) (not shown). As shown in FIG. 5D, step a) (104) can also be executed after step d) (110) and then the step sequence comprising steps b) (106) and c) (108) can be executed before the step sequence comprising steps e) (112) and f) (114). The methods (103) as shown in FIG. 5A-D may be implemented on a laboratory instrument (28) comprising at least one separation station (30, 32). If the laboratory instrument comprises at least two separation devices (30, 32), the step sequence comprising steps b) (106) and c) (108) can also be executed at the same time of the step sequence comprising steps e) (112) and f) (114) as shown in FIG. 5E. Furthermore, the timing of steps b) (106) and c) (108) can be independent from the timing of the steps e) (112) and f) (114) as shown in FIG. 5F. Thus, also the step sequence comprising steps b) (106) and c) (108) can be executed in parallel of and independent from step sequence comprising steps e) (112) and f) (114).

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A laboratory system for separating interfering substances contained in test samples, the laboratory system comprising:
   a first separation vessel comprising a first capturing molecule immobilized on a first solid surface and configured to bind a first interfering substance contained in a first test sample of a laboratory test of a first analytical method;
   a second separation vessel comprising a second capturing molecule immobilized on a second solid surface and configured to bind a second interfering substance contained in a second test sample of a laboratory test of a second analytical method, the second analytical method being different from the first analytical method;
   at least one laboratory instrument comprising at least one separation station,
      wherein the at least one separation station is configured to receive the first and second separation vessels and to separate test samples contained in the first and second separation vessels from the first and second solid surfaces of the first and second separation vessels to form first and second separated test samples,
      wherein the at least one separation station comprises at least first and second separation devices, the first separation device being configured to extract a portion of the first separated test sample from the first separation vessel for performing the first analytical method, the second separation device being configured to extract a portion of the second separated test sample from the second separation vessel for performing the second analytical method,
      each of the at least first and second separation devices being selected from the group consisting of a pipetting device, a centrifuge, a rotor, a magnetic separation and incubation station, a filtration station, and combinations thereof,
   a data base, wherein the data base comprises at least one test sample record, wherein the test sample record comprises a test sample identity and at least one test sample attribute, and wherein at least one of the at least one test sample attribute is a selective test sample attribute; and
   a management unit, wherein the management unit is communicatively connected to the laboratory instrument, wherein the management unit comprises a processor and a computer-readable medium provided with instructions to select a test sample based on the at least one selective test sample attribute, to assign an interference separation protocol to the selected test sample, and to send an order based on the selected test sample and assigned interference separation protocol to the laboratory instrument.

2. The laboratory system according to claim 1, wherein at least one of the first and the second separation vessel is a rotatable separation vessel.

3. The laboratory system according to claim 1, wherein the first and/or the second solid surface is comprised by the inner surface of the separation vessel.

4. The laboratory system according to claim 1, wherein the separation vessel comprises a filter and wherein the solid surface is comprised by the filter.

5. The laboratory system according to claim 1, wherein the separation vessel comprises beads and wherein the solid surface is comprised by the surface of the beads.

6. The laboratory system according to claim 1, wherein the first and the second analytical methods comprise different detection methods with different preceding test reactions,
   wherein the detection methods are selected from the group consisting of photometry, spectroscopy, fluorometry, turbidimetry, nephelometry, luminescence measurement, fluorescence polarimetry, flame photometry, atomic absorption photometry, potentiometry, amperometry, coulometry, resistance measurement, flow cytometry, coulter method, radiometry, imaging method, mass spectrometry, visual inspection, gravimetry, thermometry, and
   wherein the preceding test reactions are selected from the group consisting of a chemical test reaction, immunological test reaction, enzymatic test reaction, molecular biological test reaction, dye staining, coagulation test reaction, agglutination test reaction, and combinations thereof.

7. The laboratory system according to claim 1, wherein the test sample contained in the first separation vessel is a first test sample type and the test sample contained in the second separation vessel is a second test sample type and wherein the first test sample type is different from the second test sample type.

8. The laboratory system according to claim 1, wherein the laboratory instrument further comprises a test sample output area, wherein the test sample output area is operatively coupled to a laboratory transport system, wherein the laboratory transport system is operatively coupled to at least first and second analytical modules, wherein the first analytical module is different from the second analytical module.

9. The laboratory system according to claim 1, wherein the laboratory instrument further comprises a control unit, wherein the control unit comprises a processor and a computer-readable medium provided with at least first and second interference separation protocols, wherein the first interference separation protocol comprises at least one processing step to separate a test sample contained in the at least first separation vessel from the interfering substance of a laboratory test of a first analytical method, wherein the second interference separation protocol comprises at least one processing step to separate a test sample contained in the at least second separation vessel from the interfering substance of a laboratory test of a second analytical method, and wherein the processor is configured to control the laboratory instrument according to the at least first and second interference separation protocols.

10. The laboratory system according to claim 1, wherein the at least one selective test sample attribute is selected from the group consisting of a laboratory test ordered for the test sample, patient information associated with the test sample, an invalid test result, and a clinically inconsistent result of the test sample.

11. The laboratory system according to claim 1, wherein the laboratory instrument further comprises at least a first separation vessel storage section and a second separation vessel storage section, wherein the first separation vessel storage section and the second separation vessel storage section are separated from each other, and wherein the at least first separation vessel is stored in the at least first separation vessel storage section and the at least second separation vessel is stored in the at least second separation vessel storage section.

\* \* \* \* \*